United States Patent [19]
Matsuo et al.

[11] Patent Number: 5,421,365
[45] Date of Patent: Jun. 6, 1995

[54] FLOW CONTROL APPARATUS

[75] Inventors: Takenobu Matsuo; Tsuyoshi Wakabayashi, both of Kofu; Shuji Moriya, Yamanashi, all of Japan

[73] Assignee: Tokyo Electron Limited, Tokyo, Japan

[21] Appl. No.: 53,354

[22] Filed: Apr. 28, 1993

[30] Foreign Application Priority Data

Apr. 28, 1992 [JP] Japan ................... 4-110505

[51] Int. Cl.⁶ .............................................. G05D 7/06
[52] U.S. Cl. .................................. 137/599; 137/486; 137/487.5
[58] Field of Search ................... 137/486, 599, 487.5

[56] References Cited

U.S. PATENT DOCUMENTS

| | | | |
|---|---|---|---|
| 3,217,731 | 11/1965 | Swanson | 137/599 X |
| 4,197,874 | 4/1980 | Neff | 137/599 X |
| 4,374,785 | 2/1983 | Wyatt | 137/599 X |
| 4,917,535 | 4/1990 | Prassas | 137/599 X |
| 5,056,554 | 10/1991 | White | 137/599 |

Primary Examiner—Robert G. Nilson
Attorney, Agent, or Firm—Oblon, Spivak, McClelland, Maier & Neustadt

[57] ABSTRACT

A flow control apparatus comprises a base body, first and second gas passages provided in the base body for passing gas therethrough, gas flow adjusting mechanism, provided so as to connect the first and second gas passages to each other, for adjusting the flow of gas passing therethrough, and gas flow control unit for outputting a flow control signal to the gas flow adjusting mechanism so as to control the flow of gas passing through the first or second gas passage. In the base body, a bypass passage is formed in the base body for connecting the first and second gas passages to each other, and a valve mechanism is employed for opening and closing the bypass passage. When a trouble has occurred, the valve mechanism is opened, and a purging gas is supplied through the bypass passage to purge a flammable or noxious gas. Thereafter, the gas flow control apparatus is removed and repaired.

11 Claims, 4 Drawing Sheets

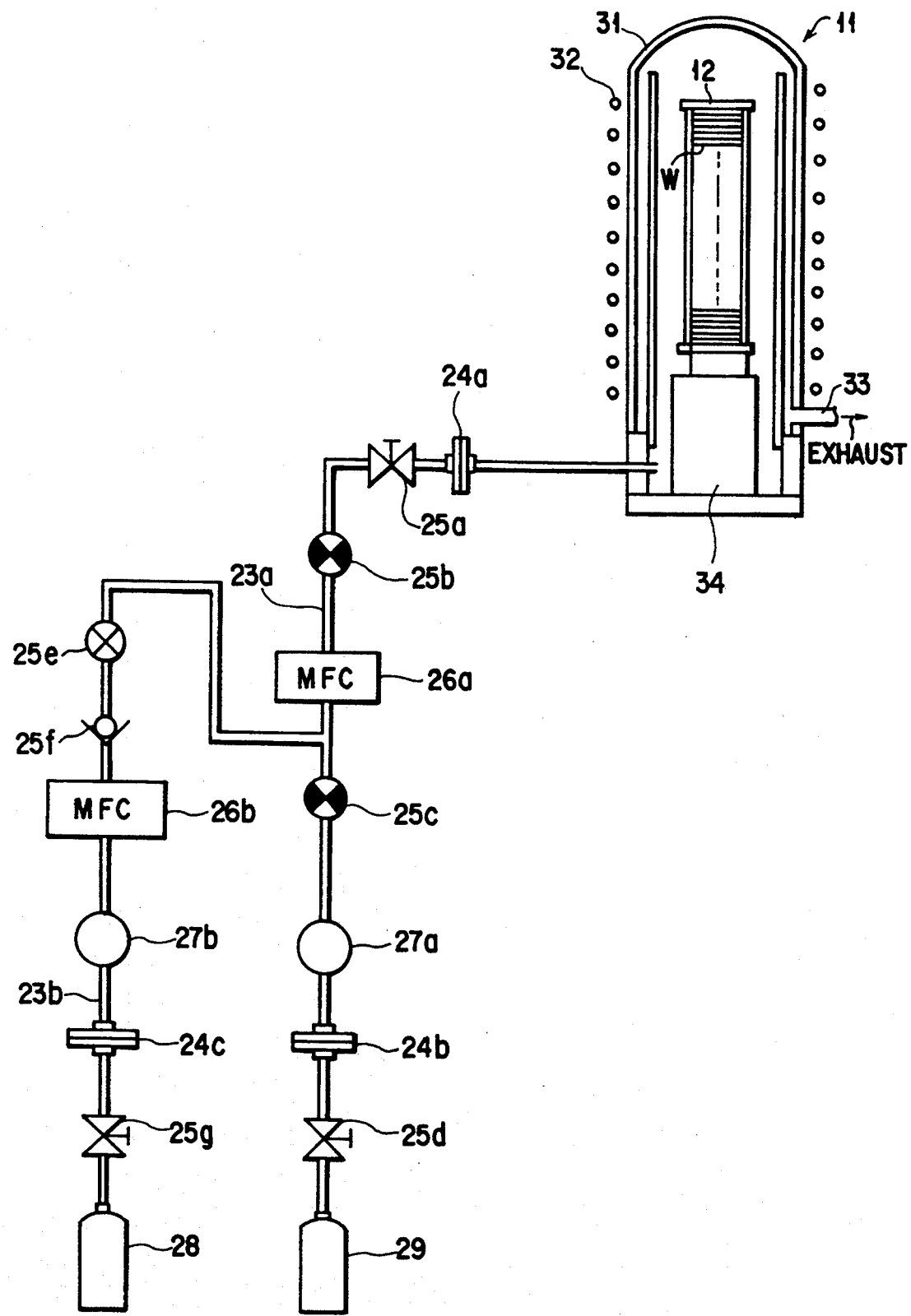
F I G. 4

FLOW CONTROL APPARATUS

BACKGROUND OF THE INVENTION

1. Field of the Invention

This invention relates to a flow control apparatus for use in a gas supply mechanism or the like.

2. Description of the Related Art

Many conventional gas supply mechanisms for supplying a given gas at a predetermined flow rate have a flow control apparatus, i.e., a mass flow controller, equipped with a flow detecting sensor for sensing the flow of a gas, a gas flow adjusting mechanism, and a control mechanism for controlling the gas flow adjusting mechanism in accordance with a flow detection signal supplied from the flow detecting sensor.

In the field of semiconductor device manufacturing, for example, the above-described flow control apparatus is employed in a gas supply mechanism used in a treatment apparatus for performing coating of a semiconductor wafer or other treatments.

Such a flow control apparatus employs a gas flow adjusting mechanism for reducing the flow of gas by reducing the cross section of the gas flow passage, i.e., restricting its size. There is possibility that a gas becomes liquefied or reacts in the gas flow adjusting mechanism, in which case the adjusting mechanism may become clogged stopping the flow of gas.

In the event of such a problem occurring, it is necessary to close the valves located upstream and downstream of the flow control apparatus, then to detach the control apparatus from the pipe arrangement, and to eliminate the problem. However, in the case where the gas is flammable or noxious, it is necessary to prevent it from leaking to the outside by using nitrogen gas, for example, to purge the gas remaining in a portion of the pipe in the vicinity of the flow control apparatus before the control apparatus is detached from the pipe arrangement.

However, if the gas passage of the flow control apparatus is closed, purging gas will not be able to flow through it. In order to deal with such a problem, a bypass pipe 4, as shown in FIG. 1, is connected to a gas supply pipe 2 across which the flow control apparatus (mass flow controller) 1 is arranged, such that it bypasses the apparatus 1. The bypass pipe 4 has a closing valve 3 which is closed in a normal state, and opened to allow the purging gas to flow through it if the flow control apparatus is clogged up. Closing valves 5 are provided across the pipe 2 at locations upstream and downstream of the flow control apparatus 1.

It is desirable that the manufacturing cost of the above-described gas supply mechanism be kept as low as possible by decreasing the number of its components, and also to reduce the possibility of gas leakage by decreasing the number of connecting portions of the pipe arrangement. Further, in the case of a semiconductor manufacturing apparatus such as, in particular, a vertical-type thermal treatment apparatus, it is desirable that the apparatus be as compact as possible in order to minimize the space required for installation, and accordingly reduce the size of the gas supply mechanism.

SUMMARY OF THE INVENTION

This invention has been developed in light of the above circumstances, and its object is to provide a flow control apparatus enabling the number of components employed in the gas supply mechanism to be decreased and hence the manufacturing cost thereof to be decreased, also enabling the number of the connecting portions of the pipe arrangement to be decreased and hence the possibility of gas leakage to be reduced, thereby enhancing the safety of the mechanism, and enabling the mechanism to be made compact.

According to the present invention, there is provided the flow control apparatus of the invention comprises: a base body; first and second gas passages provided in the base body for passing gas therethrough; gas flow adjusting means, provided so as to connect the first and second gas passages to each other, for adjusting a flow rate of gas passing therethrough; gas flow control means for outputting a flow control signal to the gas flow adjusting means so as to control the flow of gas passing through the first or second gas passage; a bypass passage formed in the base body for connecting the first and second gas passages to each other; and valve means for opening and closing the bypass passage.

In the flow control apparatus of the present invention, the bypass passage for connecting the first and second gas passages provided on the inlet and outlet sides of the gas flow adjusting means is formed in the base body in which the first and second gas passages are formed. The bypass passage is opened and closed by the valve means. This bypass passage has the function of a bypass pipe employed outside a flow control apparatus in the case of the conventional gas supply mechanism. Therefore, it is not necessary to employ a bypass pipe and a closing valve outside the flow control apparatus as in the conventional case, so that the number of components employed in the gas supply mechanism can be decreased, and the mechanism can be made compact, resulting in a reduction in manufacturing cost. Moreover, the number of the connecting portions of the pipe arrangement can accordingly be decreased, which reduces the possibility of gas leakage and enhances the safety of the gas supply mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a view, useful in explaining a gas supply pipe arrangement employed in the gas supply mechanism of FIG. 3.

DETAILED DESCRIPTION OF THE PREFERRED EMBODIMENT

The embodiment of the invention will be explained in detail with reference to the accompanying drawings.

Figure 1:
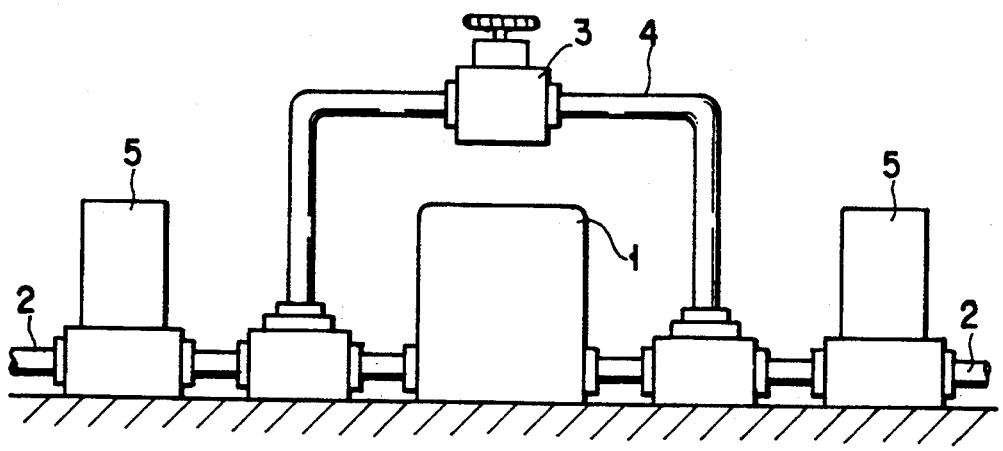
FIG. 1 is a side view, showing a conventional gas supply mechanism.
Figure 2:
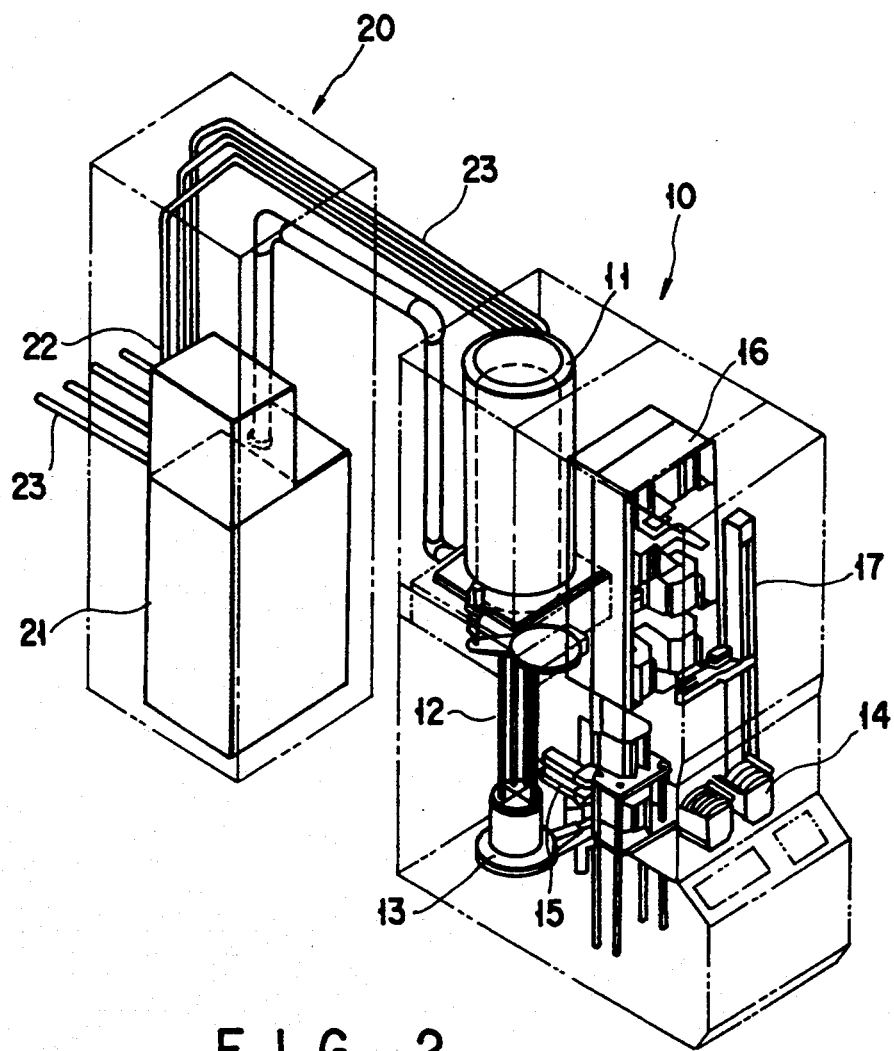
FIG. 2 is a perspective view, showing a vertical-type thermal treatment apparatus to which a gas flow control apparatus according to the present invention is applied.

FIG. 2 is a perspective view, showing a vertical-type thermal treatment apparatus to which a flow control apparatus according to the present invention is applied. As is shown in FIG. 2, the thermal treatment apparatus comprises a thermal treatment unit 10 and a gas supply unit 20 located behind the unit 10.

The thermal treatment unit 10 has a vertically-extending cylindrical thermal treatment furnace 11. A boat elevator 13 is provided under the furnace 11 for vertically moving a wafer boat 12, which can contain a plurality of semiconductor wafers. The boat elevator 13 can load and unload the wafer boat 12 onto and from the furnace 11. A displacing mechanism 15 is provided in front of the boat elevator 13 for displacing semiconductor wafers between the wafer boat 12 and a wafer cassette 14. A cassette accommodating mechanism 16 for accommodating a plurality of wafer cassettes 14 and a transfer mechanism 17 for transferring the wafer cassettes 14 are provided above the displacing mechanism 15.

The gas supply unit 20 has a vacuum exhaustion mechanism 21 for exhausting the thermal treatment furnace 11 of gas, and a gas supply mechanism 22 provided thereon for supplying a purging gas and a treatment gas into the furnace 11. A treatment gas is supplied from the gas supply mechanism 22 into the furnace 11, while the furnace 11 is evacuated by the vaccum exhaustion mechanism 21, thereby forming a vacuum atmosphere under a predetermined gas pressure in the furnace 11, in which a thermal treatment such as a film forming treatment is performed.

Figure 3:
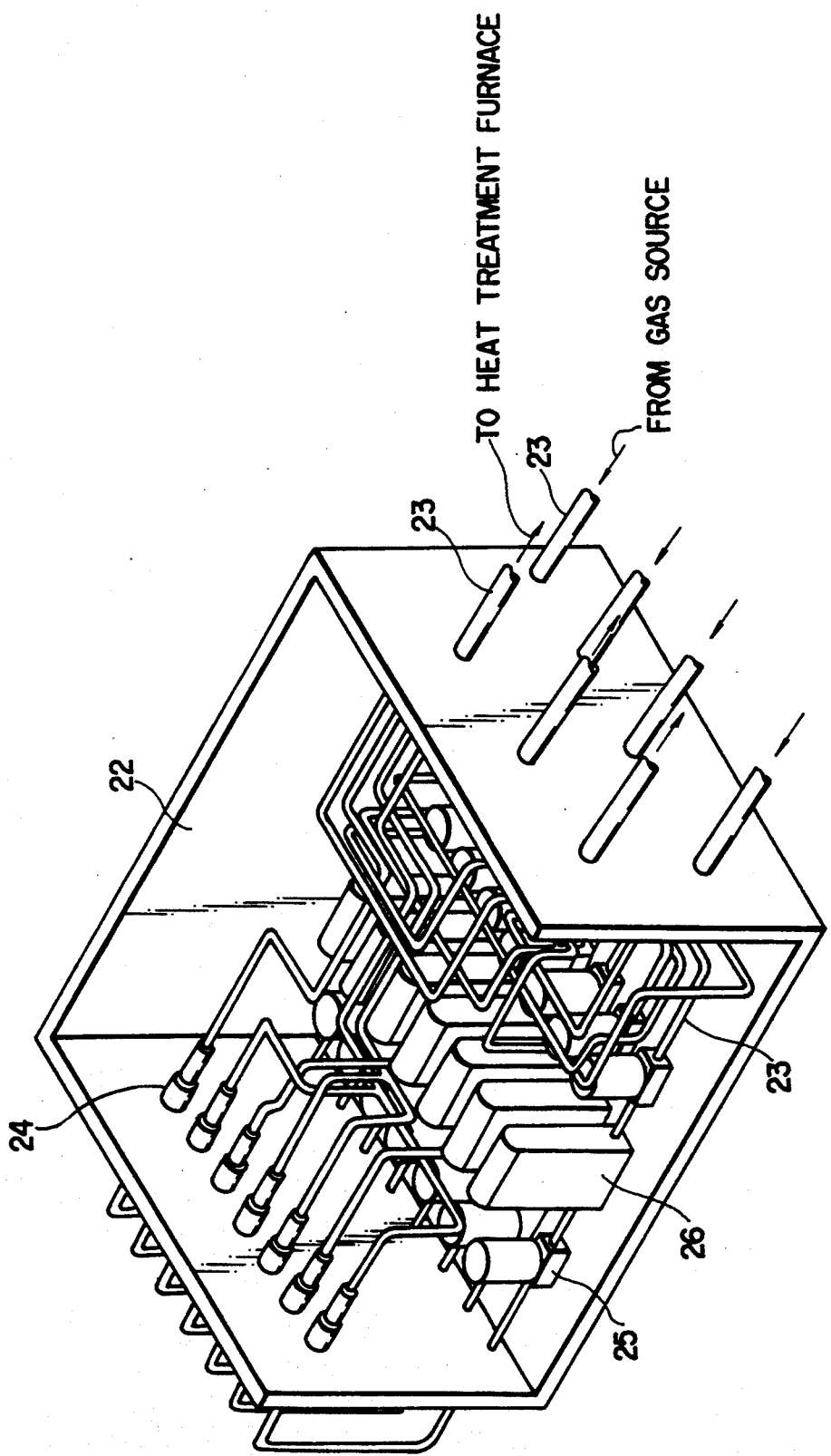
FIG. 3 is a perspective view, showing a gas supply mechanism employed in the apparatus of FIG. 2.

As is shown in FIG. 3, the gas supply mechanism 22 has a plurality of gas supply pipes 23 corresponding to the number of the kinds of gases to be used, and a filter 24, a valve 25, and a flow control apparatus (mass flow controller) 26 which are provided for each of the pipes 23. Gases are supplied into the gas supply mechanism 22 from four gas supply sources through corresponding four of the gas supply pipes 23, and gases are supplied into the thermal treatment apparatus 11 from the gas supply mechanism 22 through three of the pipes 23.

Gas flow in the gas supply mechanism 22 will be explained in detail with reference to FIG. 4. FIG. 4 shows only one of gas lines employed. A treatment gas such as $SiH_2Cl_2$ is contained in a treatment gas source 29, which is connected to the thermal treatment furnace 11 through a gas supply pipe 23a. Between the treatment gas source 29 and the thermal treatment furnace 11, there are provided a valve 25d, a filter 24b, a regulator 27a, an air operation valve 25c, a flow control apparatus (mass flow controller) 26a, an air operation valve 25b, and a valve 25a. A purging gas source 28 containing a purging gas consisting of an inactive gas such as pure nitrogen is connected to the gas supply pipe 23b. The pipe 23b is connected to the gas supply pipe 23a between the mass flow controller 26a and the valve 25c. A valve 25g, a filter 24c, a regulator 27b, a mass flow controller 26b, a one-way valve 25f, and a valve 25e are arranged across the pipe 23b. By virtue of this structure, a treatment gas or a purging gas can be selectively supplied at a predetermined flow rate into the thermal treatment furnace 11. The furnace 11 has a process tube 31 and a heater 32 provided around it. The wafer boat 12 having wafers W mounted therein is received in the process tube 31 in a state where it is placed on a heat retaining cylinder 34. A gas exhaustion port 33 is formed in the process tube 31 and connected to the vacuum exhaustion mechanism 21.

In the case of forming, for example, a silicon nitride film on a wafer in the thermal treatment furnace 11, $NH_3$ (ammonia) gas is used, in addition to $SiH_2Cl_2$ (dichlorosilane) gas. Ammonia gas is supplied into the furnace 11 through a gas line not shown in FIG. 4.

Then, the flow control apparatus will be explained. The present invention is applicable to that one of the flow control apparatuses 26 which is provided across a gas supply arrangement for supplying a flammable or noxious gas to be prevented from leaking to the outside, such as $SiH_2Cl_2$ or $NH_3$. The flow control apparatus to which the present invention is applied (e.g. the flow control apparatus 26a) is constructed as below.

Figure 5:
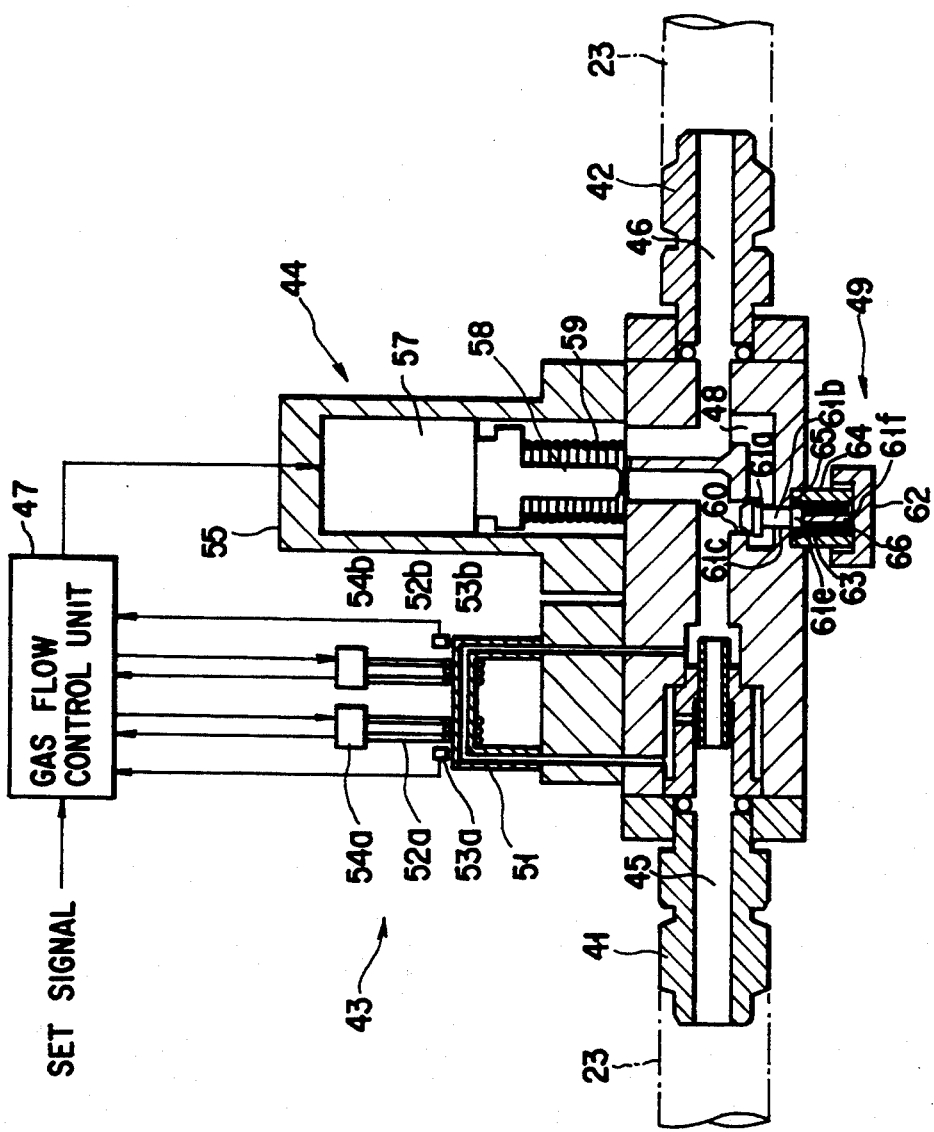
FIG. 5 is a cross sectional view, showing a flow control apparatus according to the invention.

FIG. 5 is a cross sectional view, showing a flow control apparatus of this type. The apparatus has a base block 40, a gas flow sensor 43, a gas flow adjusting mechanism 44, and a gas flow control unit 47.

An inlet side pipe connecting unit 41 and an outlet side pipe connecting unit 42 are provided at both opposite ends of the base block 40. The gas supply pipe 23 is connected to the base block 40 by the connecting units 41 and 42. In the base block 40, a first gas passage 45 is provided between the connecting unit 41 and the gas flow adjusting mechanism 44, and a second gas passage 46 between the gas flow adjusting mechanism 44 and the connecting unit 42. Gas supplied into the base block 40 through the inlet side pipe connecting unit 41 passes the first gas passage 45 and reaches the flow adjusting mechanism 44, where it has its flow rate controlled. Then, the gas passes the second gas passage 46 and is discharged through the outlet pipe connecting unit 42.

Further, a bypass passage 48 connecting the first and second gas passages 45 and 46 to each other is provided in the base block 40. A valve mechanism 49 is located across the bypass passage 48. The valve mechanism 49 has a valve member 61 closed during normal treatment and opened only when a trouble occurs.

Further, the valve mechanism 49 has a valve seat provided at the inlet of the bypass passage 48, and a valve head portion 61a, which can be brought into contact with the valve seat 60, provided in the passage 48. A valve rod 61b extends downward from the valve head portion 61a, through a hole 61c formed in the base block 40, to the outside thereof. The rod 61b has a piston portion 61e which slidably extends in an airtight manner by means of an O-ring 65 through a cylinder 64 projecting from the base block 40. A small-diameter rod portion 61f extends downward from the piston portion 61e. A spring 63 is provided around the rod portion 61f, and held between the piston portion 61e and, for example, a C-ring 66 fitted in a groove formed in a lower inner peripheral portion of the cylinder 64. A cap screw 62 is provided at a lower end of the rod portion 61f, and is screwed in a screw portion formed in the outer periphery of the cylinder 64. The screw 62 can be moved in the vertical direction by being rotated.

The opening and closing operations of the above valve mechanism 49 are performed by rotating the cap screw 62 so as to move the valve head portion 61a upward and downward, thereby bringing the same into contact with the valve seat 60 and out of contact therefrom, respectively.

The gas flow sensor 43 has a substantially reversed-U-shaped pipe 51 for flowing part of the gas passing through the inlet side pipe connecting unit 41 and the first gas passage 45. Heating wires 52a and 52b are wound around parallel portions of the pipe 51, spaced from each other. Temperature sensors 53a and 53b are provided in the vicinity of the portions around which the wires 52a and 52b are wound, respectively. The wires 52a and 52b are connected to power supplies 54a and 54b, respectively, for applying a voltage thereto.

The power supplies 54a, 54b and temperature sensors 53a, 53b are connected to the gas flow control unit 47. The gas flow control unit 47 uses the sensors 53a and 53b to detect a temperature difference caused by gas flow, and outputs signals to the power supplies 54a and 54b to cause them to apply voltages to the heating wires 52a and 52b, until the temperature difference becomes 0. The control unit 47 detects the flow rate of gas on the basis of the difference between the voltages applied to the wires 52a and 52b, and compares the voltage difference with a voltage corresponding to a set signal set in the control unit 47, previously, thereby supplying the gas flow adjusting mechanism 44 with a control signal corresponding to the comparison result, so as to adjust the gas flow rate to a desired value.

The gas flow adjusting mechanism 44 has a housing 55, a displacement unit 57, a flow adjusting valve 58, and a spring 59 which are provided in the housing 55. The displacement unit 57 has a displacement element formed of a piezoelectric element or the like, and a power source. When a voltage is applied to the displacement element from the power source in accordance with the control signal output from the control unit 47, the element is displaced. An adjusting valve 58 is located just below the displacement unit 57, and moves in the vertical direction in accordance with displacement of the displacement element 57, thereby adjusting the flow rate of gas supplied through the first gas passage 45.

In the above-described flow control apparatus, gas reaches the flow adjusting mechanism 44 through the inlet side pipe connecting unit 41 and the first gas passage 45. The flow of gas passing through the pipe 51 is sensed by the gas flow sensor 43. The gas flow control unit 47 outputs a control signal corresponding to the sensed value, to the flow adjusting mechanism 44. In accordance with the control signal, the mechanism 44 adjusts the flow rate of gas flowing into itself from the first gas passage 45, with the result that the flow rate of gas passing through the second gas passage 46 is adjusted.

Although the above operation is performed in a normal state, if such a trouble occurs as in which the flow adjusting mechanism is closed while $SiH_2Cl_2$ or $NH_3$ flows therein, the following operation is performed: First, supply of $SiH_2Cl_2$ or $NH_3$ is stopped. Then, the valve mechanism 49 is opened, allowing the bypass passage 48 to pass gas therethrough. In this state, a purging gas such as pure nitrogen is supplied into the gas flow control apparatus through the gas supply pipe 23 from the gas source 28, to replace the gas ($SiH_2Cl_2$ or $NH_3$) remaining in the pipe 23, and first and second gas passages 45 and 46, with the purging gas. Thereafter, the gas flow control apparatus is removed from the gas supply pipe 23, and that portion of the flow adjusting mechanism 44 in which a trouble has occurred is repaired.

As explained above, when the flow control apparatus of the present invention suffers a trouble, it can be repaired without leaking a flammable or noxious gas, though it has no bypass pipe and valve located across the same as employed in the conventional case. Accordingly, the number of components employed in the gas supply mechanism can be decreased, resulting in a reduction in the manufacturing cost. Further, the gas supply mechanism and hence the treatment apparatus which employs the gas supply mechanism can be made compact. In addition, since the bypass pipe and the valve are not necessary, the number of connecting portions required in the pipe arrangement can be decreased, thereby reducing the possibility of occurrence of gas leakage therefrom. In the conventional case of employing a bypass pipe, gas remaining in the first or second gas passage 45 or 46 cannot completely be eliminated, whereas in the present invention which employs the bypass passage 48 the remaining gas can substantially completely be eliminated.

Although in the above embodiment, the invention is applied to a gas supply mechanism employed in a vertical-type thermal treatment apparatus, it is not limited to this, but is applicable to a gas flow control apparatus for use in an apparatus for supplying a flammable or noxious gas. Further, the types of the gas flow detection mechanism, of the gas flow adjusting mechanism, and of the gas flow control unit are not limited to those employed in the embodiment. For example, though a piezoelectric element is employed in the flow adjusting mechanism in the embodiment, a device expansible depending on temperature, or an electromagnet may be used in place of the piezoelectric element.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A flow control apparatus comprising:
   a base body;
   first and second gas passages provided in the base body for passing gas therethrough;
   gas flow adjusting means, provided so as to connect the first and second gas passages to each other, for adjusting a flow rate of gas passing therethrough;
   gas flow control means for outputting a flow control signal to the gas flow adjusting means so as to control the flow of gas passing through the first or second gas passage;
   a bypass passage formed in the base body for connecting the first and second gas passages to each other within said base body; and
   valve means for opening and closing the bypass passage.

2. The apparatus according to claim 1, wherein the gas flow control means has a sensor unit for sensing the flow rate of gas, and a control unit for outputting a control signal on the basis of the sensed value of the sensor unit and a set value.

3. The apparatus according to claim 2, wherein the sensor unit has a bypass pipe for bypassing part of gas passing through the first or second gas passage, a pair of heaters provided on two portions of the bypass pipe, a pair of power supplies for applying voltages to the heaters, respectively, and a pair of temperature sensors provided in the vicinity of the heaters, respectively.

4. The apparatus according to claim 3, wherein the control unit receives signals indicative of temperatures from the temperature sensors, then outputting signals to the power supplies so as to decrease to zero the difference between the temperatures, comparing a signal indicative of a set voltage; with signals output from the power supplies and indicative of voltages applied to the heaters, and supplying the gas flow adjusting mechanism with a control signal corresponding to the comparison result.

5. The apparatus according to claim 1, wherein the gas flow adjusting mechanism has a displacement unit and a flow adjusting valve, and adjusts the flow of gas by displacing the displacement unit in accordance with the control signal from the gas flow control means.

6. The apparatus according to claim 1, wherein the valve means comprises a valve seat provided at the inlet of the bypass passage, and a valve member disposed to cooperate with the valve seat.

7. The apparatus according to claim 6, wherein the valve member has a valve head portion located in the bypass passage, and a valve rod portion extending from the valve head portion to the outside of the base body.

8. The apparatus according to claim 7, wherein the valve rod portion slidably extends in a hole formed in the base body, and further comprising seal means for sealing a clearance between the outer periphery of the valve rod portion and the inner periphery of the hole.

9. The apparatus according to claim 8, wherein the seal means includes an O-ring.

10. The apparatus according to claim 7, further comprising means provided at the valve rod portion for bringing the valve head portion into contact with the valve seat and out of contact therefrom.

11. The apparatus according to claim 1, wherein said gas passes through said bypass passage when either of said first and second gas passages becomes clogged.

* * * * *